(12) United States Patent
Telesco et al.

(10) Patent No.: US 10,746,601 B2
(45) Date of Patent: Aug. 18, 2020

(54) INTEGRATED MINIATURE POLARIMETER AND SPECTROGRAPH USING STATIC OPTICS

(71) Applicant: University of Florida Research Foundation, Inc., Gainesville, FL (US)

(72) Inventors: Charles Michael Telesco, Gainesville, FL (US); William B. Sparks, Baltimore, MD (US); Bo Zhao, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 22 days.

(21) Appl. No.: 15/569,864

(22) PCT Filed: Apr. 20, 2016

(86) PCT No.: PCT/US2016/028380
§ 371 (c)(1),
(2) Date: Oct. 27, 2017

(87) PCT Pub. No.: WO2016/176088
PCT Pub. Date: Nov. 3, 2016

(65) Prior Publication Data
US 2018/0106677 A1    Apr. 19, 2018

Related U.S. Application Data

(60) Provisional application No. 62/153,720, filed on Apr. 28, 2015.

(51) Int. Cl.
*G01J 3/447* (2006.01)
*G01J 3/02* (2006.01)
(Continued)

(52) U.S. Cl.
CPC ............. *G01J 3/447* (2013.01); *G01J 3/0208* (2013.01); *G01J 3/0224* (2013.01);
(Continued)

(58) Field of Classification Search
CPC ........ G01J 3/447; G01J 3/2823; G01J 3/0256; G01J 3/0208; G01J 3/0291; G01J 3/0224;
(Continued)

(56) References Cited

U.S. PATENT DOCUMENTS

| 2,740,317 A | * | 4/1956 | Kelly | G02B 27/142 359/588 |
| 4,215,273 A | * | 7/1980 | Frosch | G01J 3/02 250/347 |

(Continued)

OTHER PUBLICATIONS

Nitto, Prisms, Jan. 4, 2008, via wayback machine, p. 2 (Year: 2008).*

(Continued)

*Primary Examiner* — Michael P LaPage
(74) *Attorney, Agent, or Firm* — Alston & Bird LLP

(57) ABSTRACT

Embodiments provide an integrated miniature polarimeter and spectrograph (IMPS) and associated methods for using an IMPS to determine Stokes parameters to describe a source beam. In one embodiment an IMPs is provided comprising a spectropolarimeter module. The spectropolarimeter module comprises a miniature optical bench; a slit component; a birefringent wedge; a dichroic prism; a spectral disperser; and a focal plane array. The slit component, birefringent wedge, dichroic prism, spectral disperser, and focal plane array are mounted to the miniature optical bench such that a beam incident on the slit component will be incident on (1) the birefringent wedge, (2) the dichroic prism, (3) the spectral disperser, and (4) the focal plane array, in that order.

22 Claims, 6 Drawing Sheets

(51) Int. Cl.
  *G01J 4/00* (2006.01)
  *G01J 3/28* (2006.01)
  *G01J 3/12* (2006.01)
(52) U.S. Cl.
  CPC ........... *G01J 3/0256* (2013.01); *G01J 3/0291* (2013.01); *G01J 3/2823* (2013.01); *G01J 4/00* (2013.01); *G01J 2003/1208* (2013.01); *G01J 2003/1291* (2013.01)
(58) Field of Classification Search
  CPC ................. G01J 4/00; G01J 2003/1291; G01J 2003/1208
  See application file for complete search history.

(56) References Cited

U.S. PATENT DOCUMENTS

| | | | |
|---|---|---|---|
| 5,337,146 A | 8/1994 | Azzam | |
| 6,734,967 B1* | 5/2004 | Piwonka-Corle | G01N 21/211 356/369 |
| 7,023,546 B1 | 4/2006 | Mcmillan | |
| 7,523,761 B2* | 4/2009 | Stiehl | E03F 5/107 137/398 |
| 7,616,319 B1 | 11/2009 | Woollam et al. | |
| 2001/0021018 A1 | 9/2001 | Basiji et al. | |
| 2007/0030551 A1 | 2/2007 | Oka et al. | |
| 2010/0007878 A1* | 1/2010 | Wolleschensky | G01J 3/02 356/328 |
| 2012/0268745 A1* | 10/2012 | Kudenov | G01J 3/447 356/453 |
| 2013/0063722 A1 | 3/2013 | Sparks | |
| 2013/0321806 A1 | 12/2013 | Kester | |
| 2014/0009757 A1* | 1/2014 | Bodkin | G01J 4/04 356/300 |
| 2014/0168772 A1 | 6/2014 | Perreault | |
| 2015/0185460 A1* | 7/2015 | Nakasho | G02B 21/16 250/459.1 |

OTHER PUBLICATIONS

3LCD, Projector structure, Jan. 14, 2014, p. 1 (Year: 2014).*
Hough, J., "High Sensitivity Polarimetry: Techniques and Applications", Polarimetric Detection, Characterization and Remote Sensing, NATO Science for Peace and Security Series C: Environmental Security 2011, pp. 177-204, Springer, NATO/OTAN.
International Searching Authority, International Search Report and Written Opinion for International Application No. PCT/US2016/028380, dated Jul. 28, 2016, 18 pages, Korean Intellectual Property Office, Republic of Korea.
Mu, Tingkui, et al., "Models for Polarization Detection with the Modified Polarization Interference Imaging Spectrometer", Optik—International Journal for Light and Electron Optics, Apr. 2013, pp. 661-665, vol. 124, Issue 7, Elsevier GmbH.
Sparks, William, et al., "Compact and Robust Method for Full Stokes Spectropolarimetry", Applied Optics, Aug. 1, 2012, pp. 5495-5511, vol. 51, No. 22, retrieved from <http://www.opticsinfobase.org/ao/abstract.cfm?uri=ao-51-22-5495>.

* cited by examiner

INTEGRATED MINIATURE POLARIMETER AND SPECTROGRAPH USING STATIC OPTICS

CROSS-REFERENCE TO RELATED APPLICATIONS

This application is a national phase application of Intl. Application No. PCT/US2016/028380, filed Apr. 20, 2016, which claims priority to U.S. Application No. 62/153,720, filed Apr. 28, 2015, the contents of which are incorporated herein in their entireties.

BACKGROUND

It has long been known that the spectrum of a source encodes a large amount of information about the source. For example, the composition of the sun has been determined based on the observed solar spectrum. The polarized spectrum of a source carries additional information related to the source. For example, the polarized spectrum of an exoplanet may carry information indicative of whether the atmosphere of the exoplanet contains organic molecules associated with life. Thus, spectropolarimeters are important tools for researchers. Additionally, spectropolarimetry has applications in astronomy, remote sensing, medical diagnostics, biophysics, microscopy, and fundamental experimental physics.

Most polarimetric methods include rotating waveplates, polarization analyzers, and/or the like. Rotating waveplates, polarization analyzers, and/or the like require the use of motors, gears, drive shafts, a power source, and/or the like. These components increase the size of the polarimeter, and also the weight, cost, and power consumption of the polarimeter. Additionally, any moving parts greatly increase the possibility for instrument failure. Moreover, such methods can cause approximately half the photons received at the polarimeter to be discarded. In some applications, such as polarimetry measurements of faint astrophysical objects (e.g., exoplanets), the reduction of photon throughput greatly reduces the feasibility of performing polarimetry measurements.

Therefore, a need exists for new and improved apparatuses, systems, and methods for performing spectropolarimetry measurements.

BRIEF SUMMARY

Various embodiments of the present invention provide an integrated miniature polarimeter and spectrograph (IMPS) using static optics. In particular, embodiments of the present invention provide an instrument and associated methods that can be used to deduce, calculate, and/or determine one or more of the four Stokes parameters without the use of moving parts. The Stokes parameters are the quantities measured by IMPS that are then used to compute the actual magnitude and orientation of the polarization.

According to one aspect of the present invention, an integrated miniature polarimeter and spectrograph (IMPS) is provided. In one embodiment the IMPS comprises a spectropolarimeter module. In example embodiments, the spectropolarimeter module comprises a miniature optical bench; a slit component; a birefringent wedge; a dichroic prism; a spectral disperser; and a focal plane array. The slit component, birefringent wedge, dichroic prism, spectral disperser, and focal plane array are mounted to the miniature optical bench such that a beam incident on the slit component will be incident on (1) the birefringent wedge, (2) the dichroic prism, (3) the spectral disperser, and (4) the focal plane array, in that order.

According to another aspect of the present invention, methods for determining Stokes parameters to describe a source beam are provided. In one embodiment, the method comprises providing an integrated miniature polarimeter and spectrograph (IMPS). In example embodiments, the IMPS comprises a spectropolarimeter module comprising a slit component, a birefringent wedge, a dichroic prism, a spectral disperser, and a focal plane array. In one embodiment, the dichroic prism is a Wollaston prism. The method further comprises causing interference of various polarizations comprising a source beam through use of the birefringent wedge; spatially separating ordinary rays of the source beam and extraordinary rays of the source beam through use of the dichroic prism; dispersing the source beam into spectra through use of the spectral disperser; and converting the source beam into digital image data through use of the focal plane array. In particular in various embodiments, the interference of various polarizations comprising the source beam may be caused by the birefringent wedge; the spatial separation of the ordinary rays and the extraordinary rays of the source beam is caused by the dichroic prism; the dispersion of the source beam into spectra is caused by the spectral disperser; and the conversion of the source beam into digital image data is caused by the source beam being incident upon the focal plane array.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a block diagram of an integrated miniature polarimeter and spectrograph (IMPS), in accordance with an embodiment of the present invention;

FIG. 2 provides an example output of the spectropolarimeter module, in accordance with an embodiment;

Figure 5:
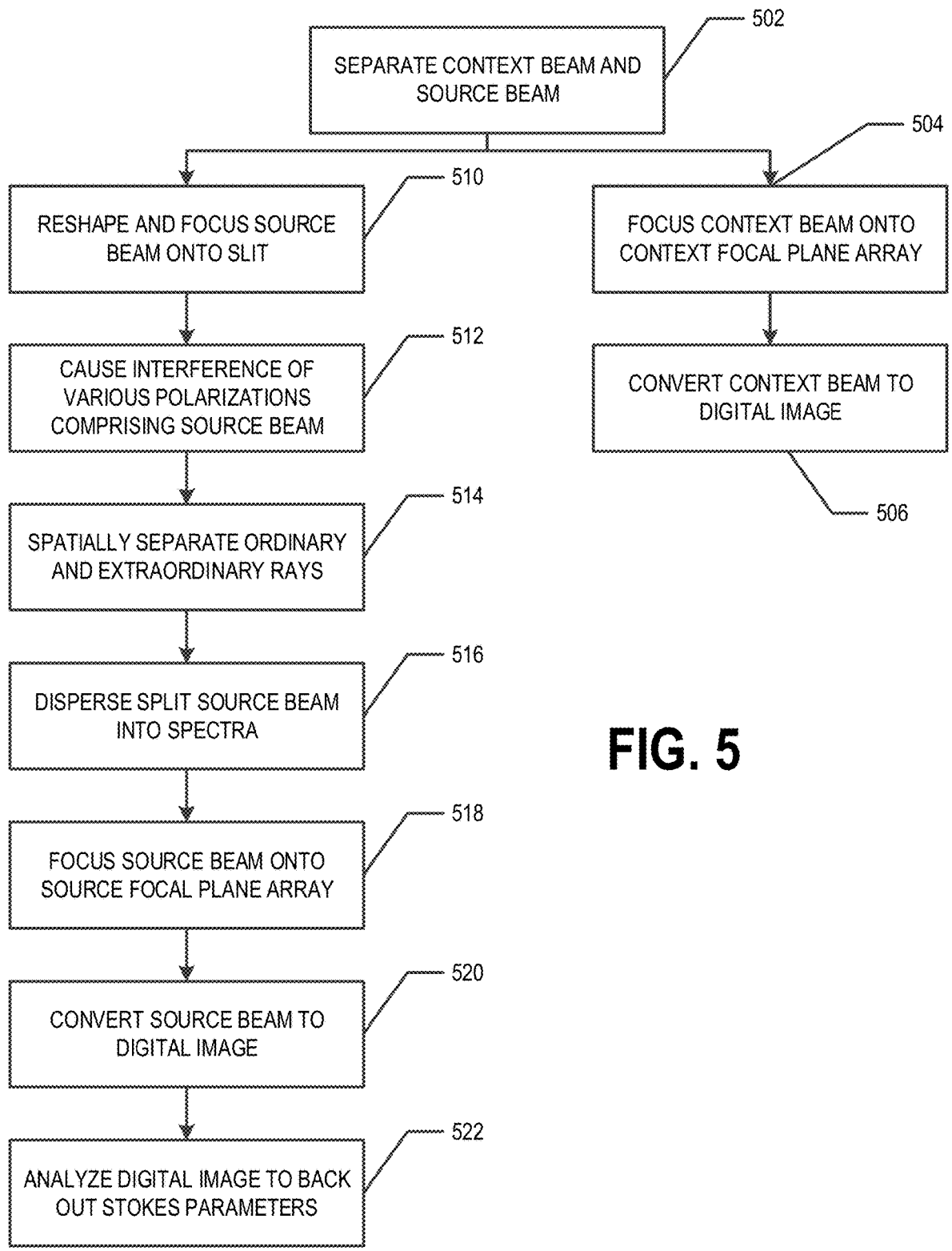
Figure 6:
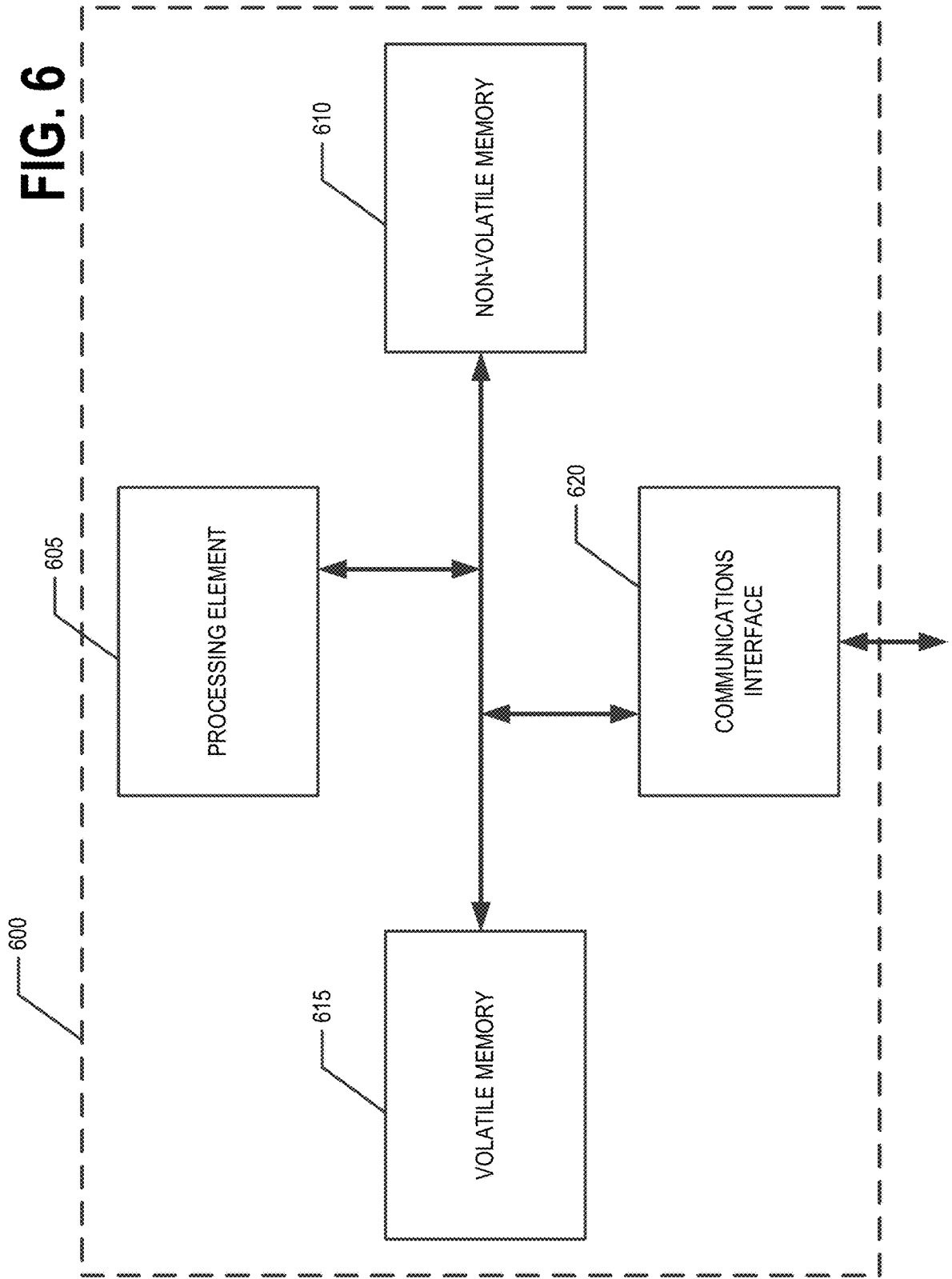

FIG. 5 provides a flowchart illustrating processes and procedures of using an IMPS to analyze the Stokes parameters of a received beam; and FIG. 6 provides a block diagram of a data management computing entity according to an embodiment of the present invention.

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

I. Overview

Figure 1:
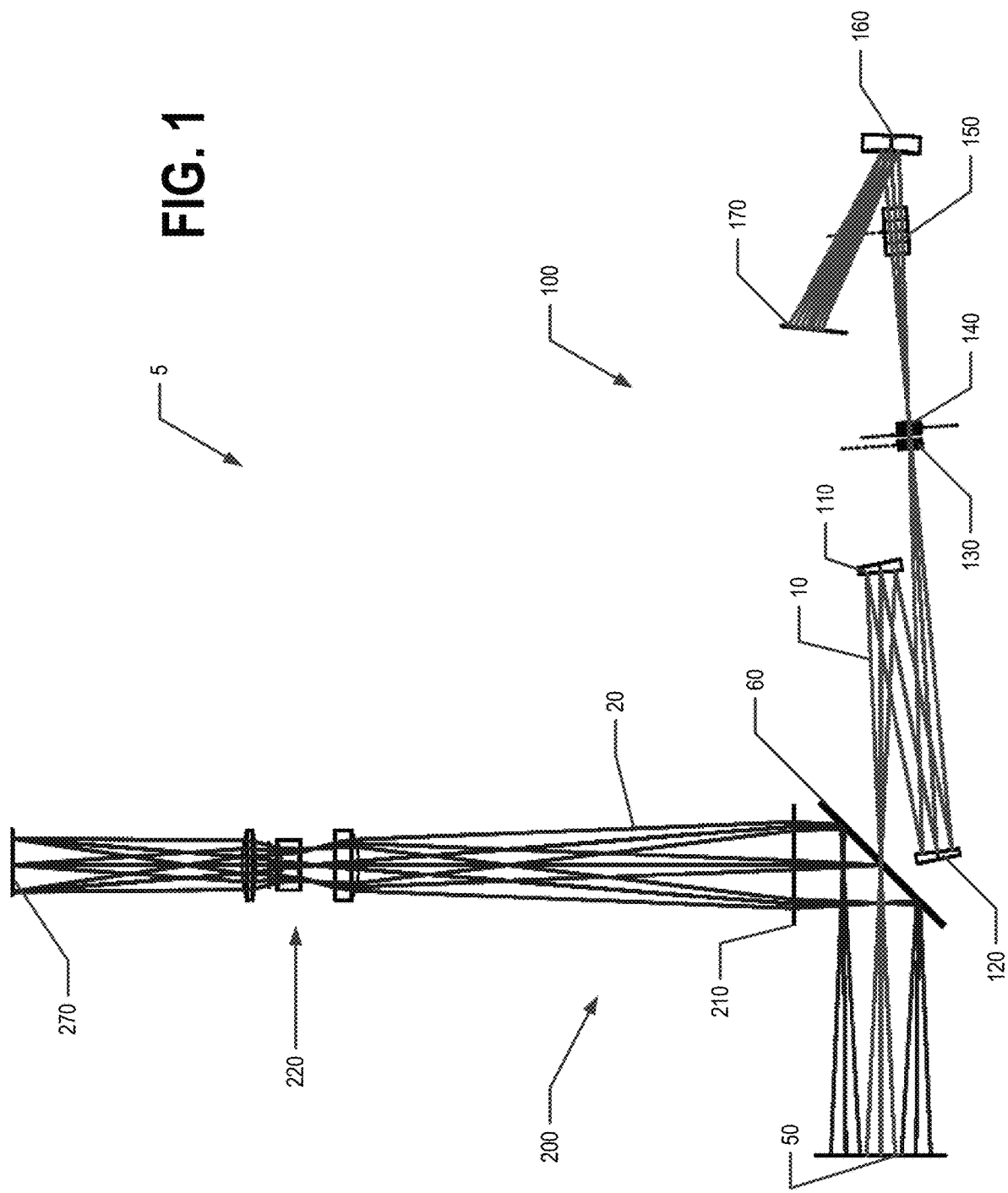

Embodiments of the present invention provide an integrated miniature polarimeter and spectrograph (IMPS). As shown in FIG. 1, in various embodiments, an IMPS 5 comprises a spectropolarimeter module 100. In various embodiments, the IMPS 5 may further comprise a context imager module 200. In various embodiments, the IMPS 5 may further comprise and/or be in communication with a data management computing entity 600 (see FIG. 6). In various embodiments, the optics of the IMPS 5 may be optimized for ultra-violet (UV), optical, or infrared (IR) spectra applications.

According to various embodiments, the IMPS 5 receives an observed beam. For example, a telescope or telephoto lens 50 may focus an observed beam onto a pick-off mirror 60. For example, the pick-off mirror 60 may be positioned at the image plane for the telescope or telephoto lens 50. In some embodiments, the telescope or telephoto lens 50 may provide an f/10 beam to the IMPS 5. The pick-off mirror 60 may separate the observed beam into a source beam 10 and a context beam 20 and provide the source beam 10 to the spectropolarimeter module 100. In embodiments having a context imager module 200, the pick-off mirror 60 may provide the context beam 20 to the context imager module.

Figure 2:
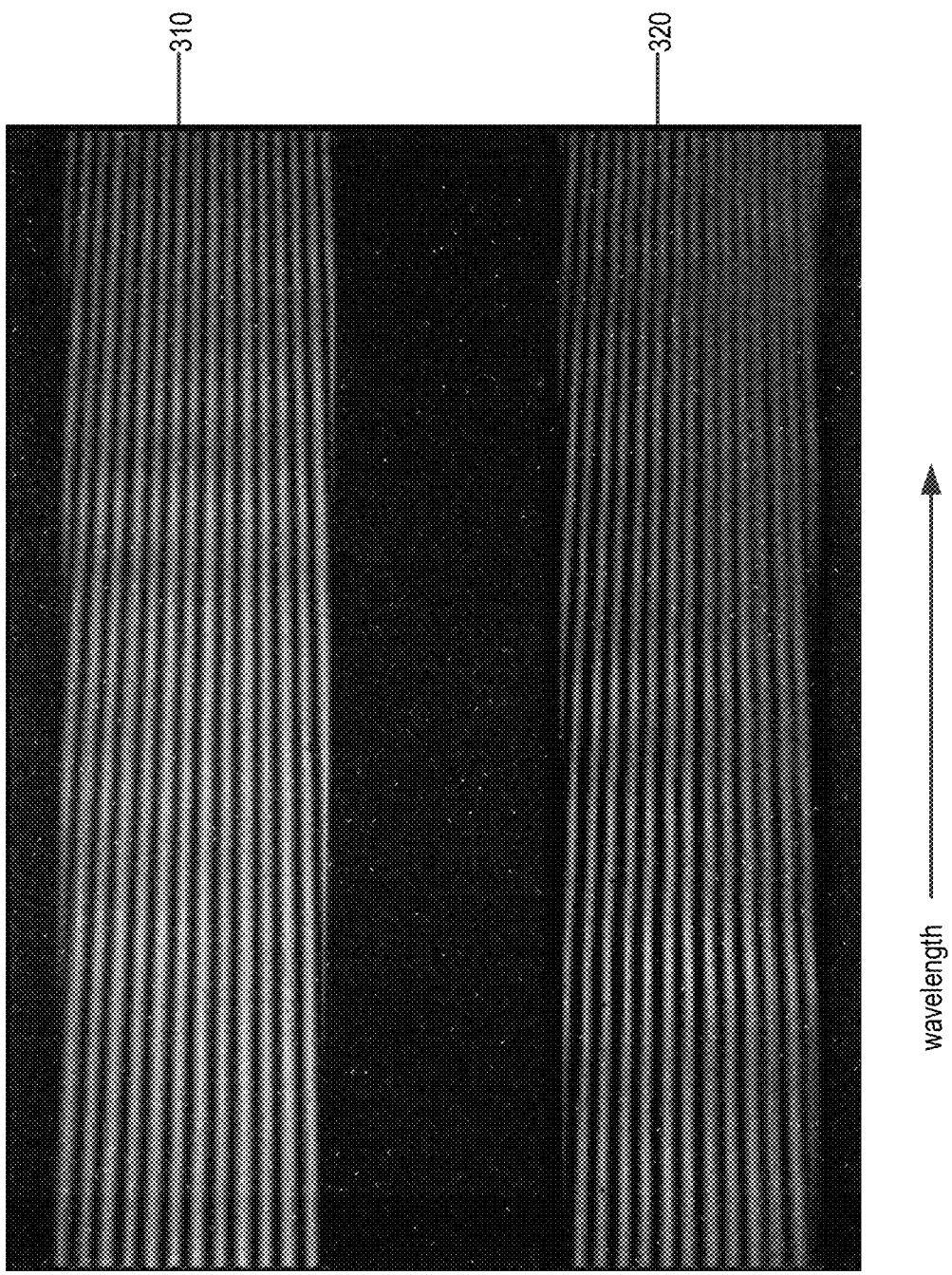

In various embodiments, the source beam 10 may be manipulated by various static optical components, as will be described in detail below, to provide polarized spectra such as the spectra shown in FIG. 2. Spectrum 310 shows the fringed spectrum of rays having a first polarization and spectrum 320 shows the fringed spectrum of the rays having a second polarization, as will be discussed in more detail below. The observed spectra 310 and 320 may be analyzed to calculate and/or determine a set of Stokes parameters that describes the source beam. Various aspects of the IMPS 5 will now be described in detail.

II. Exemplary Spectropolarimeter Module

Figure 3:
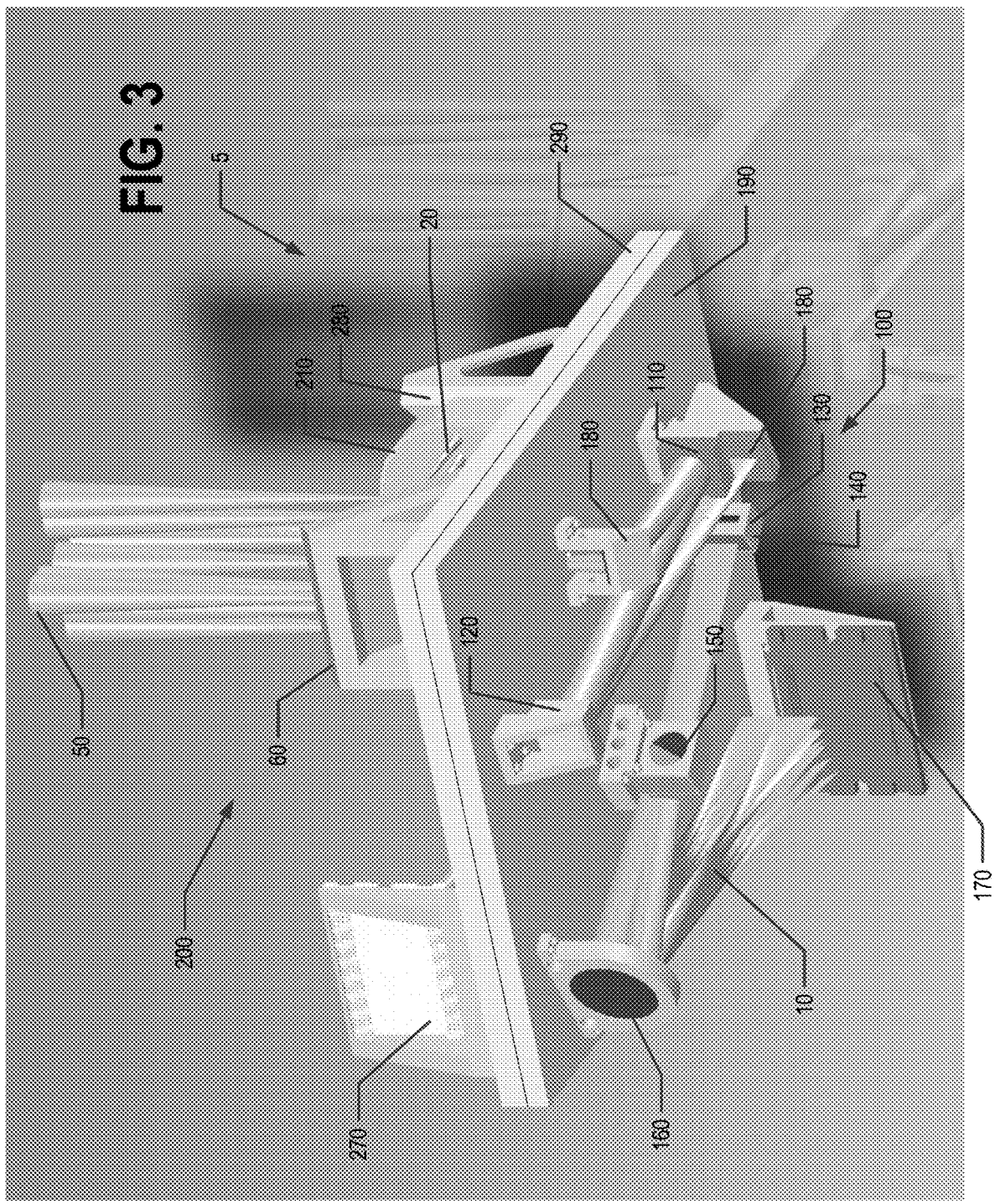
FIG. 3 illustrates an example embodiment of spectropolarimeter module of an IMPS.

As noted above, the IMPS 5 comprises a spectropolarimeter module 100. An example spectropolarimeter module 100 is illustrated in FIG. 3. In various embodiments, the spectropolarimeter module 100 comprises a slit 130, one or more birefringent wedges 140, a dichroic prism 150, a spectral disperser 160, and a focal plane array 170. The spectropolarimeter module 100 may comprise various other optical components configured to manipulate and/or condition the source beam 10 along the optical path through the spectropolarimeter module 100. For example, the spectropolarimeter module 100 may comprise a collimator 110, a cylindrical mirror 120, one or more flat folding mirrors 180, and/or the like. For example, the collimator 110 and cylindrical mirror 120 may be configured to reshape and/or condition the source beam 10. The flat folding mirrors 180 may be configured to fold the optical path traveled by the source beam 10.

As shown in FIG. 3, the source beam 10 is provided to the spectropolarimeter module 100 via the pick off mirror 60. In various embodiments, the pick-off mirror 60 comprises a flat mirror having a pick-off hole in the middle thereof. Thus, when the observed beam is incident on the pick-off mirror 60, the source beam 10 passes through the pick-off hole. The remainder of the observed beam may be reflected off the pick-off mirror and thereby provided to the context imager module 200. In various embodiments, the pick-off hole may be approximately 100 μm in diameter. In other embodiments, the pick-off hole may be larger or smaller than 100 μm as appropriate for the application.

Once the source beam 10 enters the spectropolarimeter module 100, the source beam 10 interacts with collimator 110. In various embodiments, the collimator 110 is configured to collimate the source beam 10. For example, the collimator 110 may convert the source beam 10 into a pencil beam having parallel rays. The source beam 10 may then interact with the cylindrical mirror 120. In various embodiments, the cylindrical mirror 120 may be configured to re-shape the source beam 10 into a narrow beam that is focused on the slit 130. For example, the cylindrical mirror 120 may elongate the source beam 10 such that the source beam can more efficiently propagate through the slit 130.

In various embodiments, the optical path of the spectropolarimeter module 100 may be folded. For example, the source beam 10 may encounter a folding mirror 180 or other reflective surface configured to fold the optical path of the spectropolarimeter module 100, as appropriate for the application. As should be understood, a variety of methods and optical equipment may be used to fold the optical path of the spectropolarimeter module 100, collimate the source beam 10, re-shape the source beam 10, and/or provide the source beam 10 to the slit 130.

The source beam 10 is focused on to the slit 130. In various embodiments, the slit 130 may be approximately 100 μm wide and 10 mm long. In other embodiments, the slit 130 may be wider or narrower than 100 μm and/or shorter or longer than 10 mm as appropriate for the application. After the source beam 10 passes through the slit 130, the source beam is incident upon a birefringent wedge 140 (e.g., a dichroic wedge, and/or the like). In various embodiments, the source beam 10 is incident upon the birefringent wedge 140 directly after passing through the slit 130. For example, there are no additional optical components between the slit 130 and birefringent wedge 140 and/or the source beam 10 is still close to being focused when the source beam is incident upon the birefringent wedge 140.

In various embodiments, the birefringent wedge 140 may act as a partial wave retarder. In various embodiments, the optical fast axis of the birefringent wedge 140 may be tilted by 45 degrees relative to the length of the slit 130. In various embodiments, the birefringent wedge 140 thickness gradient is parallel to the slit 130. Thus, the thickness of the birefringent wedge 140 changes along the length of the slit 130 (and along the length of the source beam 10). Thus, a ray of the source beam 10 that passes through one location along the slit 130 will pass through a thinner portion of the birefringent wedge 140 than a ray of the source beam 10 that passes through a second location along the slit 130. For example, light of a given wavelength and at each position along the slit has a different optical path length through the birefringent wedge 140. Additionally, the phase of the source beam 10 component having oscillation parallel to the fast optical axis is shifted relative to the source beam 10 component having oscillation perpendicular to the fast optical axis. Thus, the input polarization of the source beam 10 may be rotated and/or transformed at different distances along the birefringent wedge 140 in such a way that, at each position along the slit, the output of birefringent wedge 140 has a different polarization than the input polarization at that location. This rotation and/or transformation of the input polarization at different points along the birefringent wedge 140 provides a polarized intensity modulation (e.g., a series of fringes) along the length of the source beam 10 after the source beam 10 passes through the dichroic prism 150. For example, the sample spectra shown in FIG. 2 illustrate the fringes (light and dark stripes) in the spectra encoding information regarding the polarization of the source beam 10.

In various embodiments, the birefringent wedge 140 may comprise two or more birefringent wedges (e.g., a compound birefringent wedge). In various embodiments, the birefringent wedge 140 may be made of calcite ($CaCO_3$), quartz ($SiO_2$), and/or other appropriate material. In various embodiments, the birefringent wedge 140 is a single quartz wedge or a compound wedge made of two quartz wedges. In various embodiments, the birefringent wedge 140 has a wedge angle of approximately 3° or 6°. In various embodiments, the birefringent wedge 140 can have a wedge angle of greater or less than either 3° or 6°. In various embodiments, the use of more than one wedge can be used to shift the fringe pattern such that the orientation of the fringe pattern incident on the focal plane array is better matched to the geometry of the focal plan array geometry and optimized for data analysis.

Returning to FIG. 3, in various embodiments, after the source beam 10 passes through the birefringent wedge 140, the source beam 10 is provided to a dichroic prism 150. For example, the source beam 10 may be provided to a Wollaston prism. In various embodiments, the dichroic prism 150 may be configured to spatially separate the ordinary ray (rays with polarization perpendicular to the fast optical axis of the birefringent wedge, dichroic prism, and/or the spectropolarimeter module) and extraordinary rays (rays with polarization parallel to the fast optical axis of the birefringent wedge, dichroic prism, and/or the spectropolarimeter module). This spatial separation of the ordinary and extraordinary rays allows both sets of rays to be analyzed. In most methods of polarimetry, only one of the ordinary and extraordinary rays may be captured at any given moment and the photons associated with the other set of rays are not captured, leading to a significant amount of photon loss. For example, FIG. 2 shows two spectra that are captured simultaneously. The spectrum 310 shows the spectrum of the ordinary rays and spectrum 320 shows the spectrum of the extraordinary rays. Thus, the IMPS allows for a greater photon throughput and a more efficient use of captured photons. This is particularly important for the study of the polarized spectra of faint objects.

Returning to FIG. 3, after the ordinary and extraordinary rays of the source beam 10 are spatially separated, the source beam 10 is incident upon a spectral disperser 160. For example, the spectral disperser 160 may be a holographic spectroscopic grating. In other embodiments, the spectral disperser 160 may be one or more spectroscopic prisms. In various embodiments, the spectral disperser 160 may be configured to disperse the source beam 10 such that the spectrum of the source beam 10 may be observed. For example, the example output shown in FIG. 2 shows the intensity modulation of the ordinary and extraordinary rays as a function of wavelength (e.g., as a spectrum). For the example output shown in FIG. 2, the wavelength of light that produces the fringes increases from left to right across the illustrated spectra. Thus, polarization and intensity information for the source beam 10 may be calculated and/or determined at different wavelengths and/or for different wavelength ranges. For example, in some embodiments, the spectra may be binned and analyzed in common photometric filters (e.g., U, B, V, G, R, I, Z, J, K, L, and/or the like).

In the embodiment shown in FIG. 3, the spectral disperser 160 is a grating imprinted directly onto a mirror. For example, the mirror may be a powered mirror (e.g., a mirror having optical or focusing power). In various embodiments, the mirror may be configured to focus the image of the input slit 130 on to the focal plane array 170. For example, the mirror may act as a camera "lens" for the focal plane array 170. In various embodiments, the spectral disperser 160 and the mirror may be provided as two separate components. In various embodiments, the spectral disperser 160 may be imprinted on a flat mirror (called a plane reflection grating), with the powered mirror being a separate component. For example, the plane reflection grating would be inserted before the powered mirror. In various embodiments, the spectral disperser 160 may be imprinted on a flat transmissive substrate (called a plane transmission grating), with the powered mirror being a separate component. For example, the plane transmission grating would be inserted before the powered mirror. In various embodiments, the spectral disperser 160 may be one or more spectral prisms. In such embodiments, the spectral prisms may be used in association with one or more plane mirrors or powered mirrors. In various embodiments, the spectral disperser 160 may be a combination of a grating imprinted on a transmissive or reflective substrate, one or more spectral prisms, one or more powered or plane mirrors, or some combination thereof.

In various embodiments, the source beam 10 is then incident upon a focal plane array 170. In various embodiments, the focal plane array 170 may be configured to convert the source beam 10 to a digital image, such as that shown in FIG. 2. The digital image may then be provided to data management computing entity 600. In various embodiments, the focal plane array 170 may be the focal plane array of a charge-coupled device (CCD), a complementary metal-oxide-semiconductor (CMOS), and/or the like.

In various embodiments, the spectropolarimeter module 100 may be mounted on optical bench 190. In various embodiments, the optical bench 190 may be approximately rectangular with sides of 200 mm by 250 mm in length or smaller. The shape and size of the optical bench 190 may be modified as appropriate for various applications. For example, the size and shape of the optical bench 190 may be determined by the payload cavity onboard a satellite for holding the IMPS 5. The optical path of spectropolarimeter module 100 may be modified to accommodate the size and shape of the optical bench 190.

In various embodiments, the spectropolarimeter module 100 may be modified from that described herein as appropriate for the application. In various embodiments, rather than both the extraordinary rays and the ordinary rays of the source beam being incident upon the same focal plane array 170, the extraordinary rays may be incident on one focal plane array and the ordinary rays may be incident on a second focal plane array. As noted above, in various embodiments, the spectropolarimeter module 100 may be configured for performing spectropolarimetry in the UV, visible, or IR regions of the electromagnetic spectrum. For example, in an embodiment configured for UV spectropolarimetry, the birefringent wedge 140 may be an alpha barium borate (α-BBO) prism, and/or the like. Mirror coatings, the birefringent wedge 140, dichroic prism 150, spectral disperser 160, and/or focal plane array 170 may be adjusted from those described above as appropriate for the wavelength region to be investigated.

III. Exemplary Context Imager Module

Figure 4:
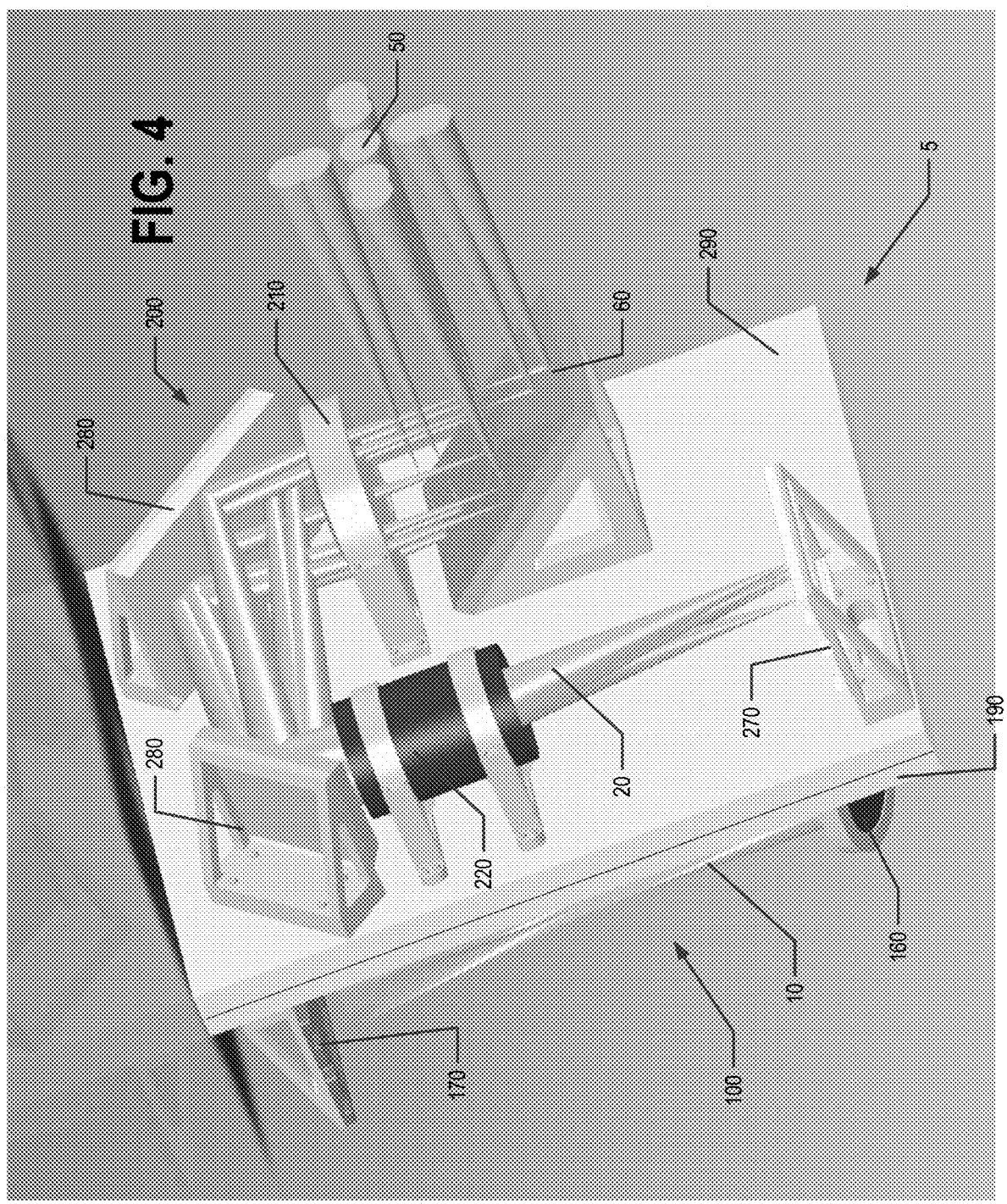
FIG. 4 illustrates an example embodiment of a context imager module of an IMPS.

In various embodiments, the IMPS 5 may comprise a context imager module 200. An exemplary context imager module 200 is illustrated in FIG. 4. In various embodiments, the pick-off mirror 60 provides a context beam 20 to the context imager module 200. For example, the pick-off mirror 60 may be configured to remove the source beam 10 from the observed beam provided by the telescope and/or telephoto lens 50 and provide the remainder of the observed beam to the context imager module 200 as the context beam 20. The context imager module 200 may be configured to provide a digital image of the region around the observation region from which the source beam 10 originates.

In various embodiments, the context imager module 200 comprises a field lens 210, beam conditioning and/or focusing components 220, and a context focal plane array 290. For example, the field lens 210 may be a positive-powered lens or group of lenses configured to modify the size of the image carried by the context beam 20. In various embodiments, the context imager module 200 may further comprise one or more flat folding mirrors configured for folding the optical path of the context imager module 200.

In various embodiments, the field lens 210 may be configured to provide image-space telecentricity for the image carried by the context beam 20. In various embodiments, the beam conditioning and/or focusing components 220 may be configured to condition the context beam 20 and/or focus the context beam 20 on to the context focal plane array 270. For example, the beam conditioning and/or focusing components 220 may be a Cooke triplet. In various embodiments, the context imager module 200 further comprises a context focal plane array 270. In various embodiments, the context focal plane array 270 may be configured to convert the context beam 20 to a digital image. The digital image may then be provided to data management computing entity 600 and/or the like. In various embodiments, the context focal plane array 270 may be the focal plane array of a charge-coupled device (CCD), a complementary metal-oxide-semiconductor (CMOS), and/or the like. In various embodiments, the context focal plane array 270 may be configured for converting optical light into a digital image even if the spectropolarimeter module 100 is configured to provide UV or IR spectra.

In various embodiments, the context imager module 200 is mounted on context optical bench 290. In various embodiments, the context optical bench 290 may be approximately rectangular with sides of 200 mm by 250 mm in length or smaller. The shape and size of the context optical bench 290 may be modified as appropriate for various applications. For example, the size and shape of the context optical bench 290 may be determined by the payload cavity onboard a satellite for holding the IMPS 5. The optical path of context imager module 200 may be modified to accommodate the size and shape of the context optical bench 290.

In various embodiments, the optical bench 190 may be mated to the context optical bench 290 to form an integrated IMPS system. For example, the components of the spectropolarimeter module 100 may be mounted on a first side of the optical bench 190 and the components of the context imager module 200 may be mounted on a first side of the context optical bench 290. The second side of the optical bench 190 and the second side of the context optical bench 290 may be mated, connected, secured together, and/or the like. This may allow the spectropolarimeter module 100 and the context imager module 200 to be assembled and tested separately and mated after each module is optimized individually. In various embodiments, the optical bench 190 and the context optical bench 290 may be mated with mechanical fasteners (e.g., bolts, nuts, screws, and/or the like), adhesive, and/or the like. In one embodiment, the optical bench 190 and the context bench 290 are integrally formed (e.g., opposite sides of one optical bench).

Various methods may be used to mate the spectropolarimeter module 100 to the context imager module 200. For example, in some embodiments, the IMPS 5 may be configured to operate with a binocular telescope. For example, the spectropolarimeter module 100 may receive the observed beam from one aperture of the binocular telescope and the context imager module 200 may receive the observed beam from the other aperture of the binocular telescope.

IV. Exemplary Method of Calculating and/or Determining the Stokes Parameters of a Source Beam In various embodiments, a method for calculating and/or determining the Stokes parameters of a source beam is provided. FIG. 5 provides a flowchart illustrating various processes and operations that may be completed in accordance with various embodiments of present invention. Starting at step 502, an observed beam is received (e.g., via telescope or telephoto lens 50) and separated into a source beam 10 and a context beam 20 (e.g., by the pick-off mirror 60). Continuing to step 510, the source beam 10 is collimated, re-shaped, and focused onto the slit. For example, collimator 110 may collimate the source beam 10 and cylindrical mirror 120 may re-shape the source beam 10 and focus the source beam 10 onto the slit 130.

At step 512, separation and recombination ("interference") of various polarizations of the source beam is caused. For example, a birefringent wedge 140 may cause a fringe pattern encoding polarization associated with the source beam 10 into the source beam 10. At step 514, the source beam 10 is separated into two spatially separated beams, one being a beam of ordinary rays and the other being a beam of extraordinary waves. For example, the dichroic prism 150 may spatially separate the ordinary rays and the extraordinary rays. At step 516, the source beam is dispersed into spectra. For example, the spectral disperser 160 may disperse the source beam 10. At step 518, the source beam is focused onto the focal plane array. For example, a powered mirror may focus the source beam onto the focal plane array 170. At step 520, the source beam is converted into a digital image. For example, the focal plane array 170 may convert the source beam into a digital image and/or digital image data. At step 522, the digital image data is analyzed to calculate and/or determine Stokes parameters describing the source beam 10. For example, the data management computing entity 600 (shown in FIG. 6) may receive digital image data from the focal plan array 170 and analyze the digital image data to calculate and/or determine Stokes parameters to describe the source beam 10. For example, in various embodiments, the non-volatile memory 610 of the data management computing entity 600 may store computer program code configured to, when executed by the processing element 605, analyze the digital image data to calculate and/or determine Stokes parameters to describe the source beam 10.

In some embodiments, the context beam 20 is provided to the context imager module 200. At step 504, the context beam is focused on to a context focal plane array 270. At step 506, the context beam 20 is converted into a digital image. For example, the context focal plane array 270 may convert the context beam into a digital image and/or context digital image data. The context focal plane array 270 may provide the context digital image data to the data management computing entity 600, and/or the like.

V. Other Hardware

In various embodiments, an IMPS 5 may be incorporated into a system for calculating and/or determining the Stokes parameters of an observed beam and/or performing other tasks. For example, an IMPS 5 may be configured to provide digital image data (e.g., captured by the spectropolarimeter focal plane array 170) and/or context digital image data (e.g., captured by the context focal plane array 270) to a data management computing entity 600. The data management computing entity 600 may be configured to analyze the digital image data to calculate and/or determine at least one of the Stokes parameters of the observed beam and/or store and/or provide digital image data and/or context digital image data and/or other data/information to various other computing entities. The data management computing entity 600 may be in communication with various other computing entities via one or more wired or wireless networks. For example, the data management computing entity 600 may be in communication with one or more satellite systems onboard the same satellite as the IMPS 5, a display device for displaying results to a user operating the IMPS 5 in the field, a device operated by an investigator, and/or the like. An example data management computing entity 600 is described in more detail below.

FIG. 6 provides a schematic of an example data management computing entity 600 according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, wearable items/devices, kiosks, input terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, calculating, analyzing, and/or similar terms used herein interchangeably. In one embodiment, these functions, operations, and/or processes can be performed on data, content, information, and/or similar terms used herein interchangeably.

As indicated, in one embodiment, the data management computing entity 600 may also include one or more communications interfaces 620 for communicating with various computing entities, such as by communicating data, information, and/or similar terms used herein interchangeably that can be transmitted, received, operated on, processed, displayed, stored, and/or the like. For instance, the data management computing entity 600 may communicate with a satellite control system, investigator computing entity, display device, and/or a variety of other computing entities.

As shown in FIG. 6, in one embodiment, the data management computing entity 600 may include or be in communication with one or more processing elements 605 (also referred to as processors, processing circuitry, and/or similar terms used herein interchangeably) that communicate with other elements within the data management computing entity 600 via a bus, for example. As will be understood, the processing element 605 may be embodied in a number of different ways. For example, the processing element 605 may be embodied as one or more complex programmable logic devices (CPLDs), microprocessors, multi-core processors, coprocessing entities, application-specific instruction-set processors (ASIPs), microcontrollers, and/or controllers. Further, the processing element 605 may be embodied as one or more other processing devices or circuitry. The term circuitry may refer to an entirely hardware embodiment or a combination of hardware and computer program products. Thus, the processing element 605 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 605 may be configured for a particular use or configured to execute instructions stored in volatile or non-volatile media or otherwise accessible to the processing element 605. As such, whether configured by hardware or computer program products, or by a combination thereof, the processing element 605 may be capable of performing steps or operations according to embodiments of the present invention when configured accordingly.

In one embodiment, the data management computing entity 600 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 610, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data management computing entity 600 may further include or be in communication with volatile media (also referred to as volatile storage, memory, memory storage, memory circuitry and/or similar terms used herein interchangeably). In one embodiment, the volatile storage or memory may also include one or more volatile storage or memory media 615, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 605. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 605 and operating system.

As indicated, in one embodiment, the data management computing entity 600 may also include one or more communications interfaces 620 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data management computing entity 600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the data management computing entity 600 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the data management computing entity's 600 components may be located remotely from other data management computing entity 600 components, such as in a distributed system. Furthermore, one or more of the components may be combined and additional components performing functions described herein may be included in the data management computing entity 600. Thus, the data management computing entity 600 can be adapted to accommodate a variety of needs and circumstances. As will be recognized, these architectures and descriptions are provided for exemplary purposes only and are not limiting to the various embodiments.

VI. Conclusion

Additional information and figures are provided in the attached Appendices. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An integrated polarimeter and spectrograph comprising:
   a spectropolarimeter module comprising:
      a spectropolarimeter optical bench;
      a slit component;
      a birefringent wedge;
      a prism configured to cause spatial separation of ordinary rays and extraordinary rays of a source beam incident thereon;
      a spectral disperser; and
      a focal plane array,
      wherein:
         the slit component, birefringent wedge, prism, spectral disperser, and focal plane array are mounted to a first spectropolarimeter bench side of the spectropolarimeter optical bench such that a beam incident on the slit component will be incident on (1) the birefringent wedge, (2) the prism, (3) the spectral disperser, and (4) the focal plane array, in that order, and
         the ordinary rays and the extraordinary rays are both incident on the focal plane array; and
   a context imager module, the context imager module comprising:
      a context optical bench; and
      a context focal plane array mounted to a first context bench side of the context optical bench;
   wherein:
      the spectropolarimeter optical bench has a second spectropolarimeter bench side opposite the first spectropolarimeter bench side,
      the context optical bench has a second context bench side opposite the first context bench side, and
      the second spectropolarimeter bench side is mated to the second context bench side.

2. The integrated polarimeter and spectrograph of claim 1, wherein the prism is a Wollaston prism.

3. The integrated polarimeter and spectrograph of claim 1, wherein the spectropolarimeter module further comprises a powered mirror configured to focus the beam onto the focal plane array.

4. The integrated polarimeter and spectrograph of claim 3, wherein the spectral disperser is one of (a) a grating imprinted directly onto the powered mirror, (b) a grating imprinted onto a flat transmissive or reflective surface positioned just prior to the powered mirror along a light path of the integrated polarimeter and spectrograph, (c) one or more spectral prisms positioned just prior to the powered mirror along the light path of the integrated polarimeter and spectrograph, or (d) a combination thereof.

5. The integrated polarimeter and spectrograph of claim 1, further comprising a data management computing entity, the data management computing entity configured to receive digital image data from the focal plane array.

6. The integrated polarimeter and spectrograph of claim 5, wherein the data management computing entity is configured to calculate up to four Stokes parameters to describe the source beam based on the digital image data received from the focal plane array.

7. The integrated polarimeter and spectrograph of claim 1, wherein the spectropolarimeter module further comprises one or more folding mirrors, each folding mirror being configured to fold the optical path of the spectropolarimeter module.

8. The integrated polarimeter and spectrograph of claim 1, wherein at least one of the birefringent wedge, prism, spectral disperser, or the focal plane array is optimized for at least one of optical, ultra-violet, or infrared spectra.

9. The integrated polarimeter and spectrograph of claim 1, wherein the spectropolarimeter optical bench has dimensions of approximately 200 mm by 250 mm.

10. The integrated polarimeter and spectrograph of claim 1, wherein the birefringent wedge is made of at least one of calcite or quartz.

11. The integrated polarimeter and spectrograph of claim 1, wherein the birefringent wedge is a compound birefringent wedge.

12. The integrated polarimeter and spectrograph of claim 11, wherein the compact birefringent wedge is configured to shift a fringe pattern position on the focal plane array such that an orientation of the fringe pattern is optimized to at least one of a geometry of the focal plane array or data analysis of digital image data.

13. The integrated polarimeter and spectrograph of claim 1, wherein the birefringent wedge has a wedge angle of between 1 and 8 degrees.

14. The integrated polarimeter and spectrograph of claim 1, wherein the birefringent wedge has a wedge angle of at least one of approximately 3 degrees or approximately 6 degrees.

15. The integrated polarimeter and spectrograph of claim 1, wherein at least one of a fast optical axis of the birefringent wedge is tilted by 45 degrees with respect to a long axis of the slit component or a thickness gradient of the of the birefringent wedge is parallel to the long axis of the slit component.

16. The integrated polarimeter and spectrograph of claim 1, further comprising at least one of a telescope or a telephoto lens configured to provide an observed beam to the spectropolarimeter module.

17. The integrated polarimeter and spectrograph of claim 1, further comprising a data management computing entity, the data management computing entity configured to receive digital image data from at least one of the focal plane array or the context focal plane array.

18. The integrated polarimeter and spectrograph of claim 1, further comprising a pick-off mirror comprising a mirror substrate having a hole therein, the hole configured to provide the source beam to the spectropolarimeter module and a context beam to the context imager module, wherein the source beam passes through the hole and the context beam reflects off of the pick-off mirror.

19. The integrated polarimeter and spectrograph of claim 18, further comprising at least one of a telescope or telephoto lens, the hole in the pick-off mirror positioned at an image plane of the telescope or telephoto lens.

20. The integrated polarimeter and spectrograph of claim 1, wherein the context imager module further comprises at least one of a field lens or a Cooke triplet.

21. The integrated polarimeter and spectrograph of claim 1, wherein the spectropolarimeter optical bench and the context optical bench have the same dimensions.

22. The integrated polarimeter and spectrograph of claim 1, wherein (a) the focal plane array comprises a first focal plane array and a second focal plane array, (b) the ordinary rays are incident on the first focal plane array, and (c) the extraordinary rays are incident on the second focal plane array.

* * * * *